Jan. 12, 1954
F. W. CARPENTER
2,666,125
FLATIRON CORD CONNECTION
Filed June 14, 1948
2 Sheets—Sheet 2
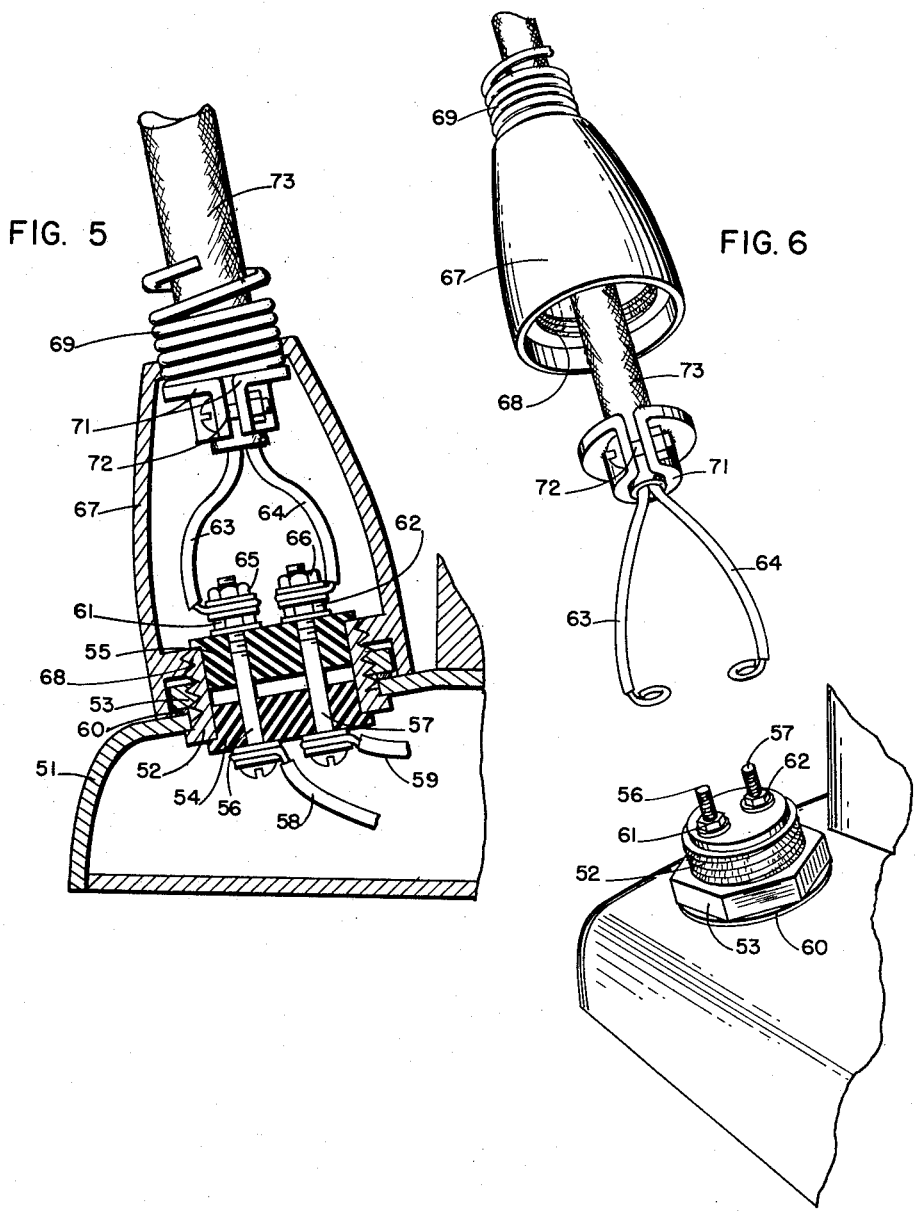
INVENTOR
FRANK W. CARPENTER
BY William C. Babcock
ATTORNEY Patented Jan. 12, 1954

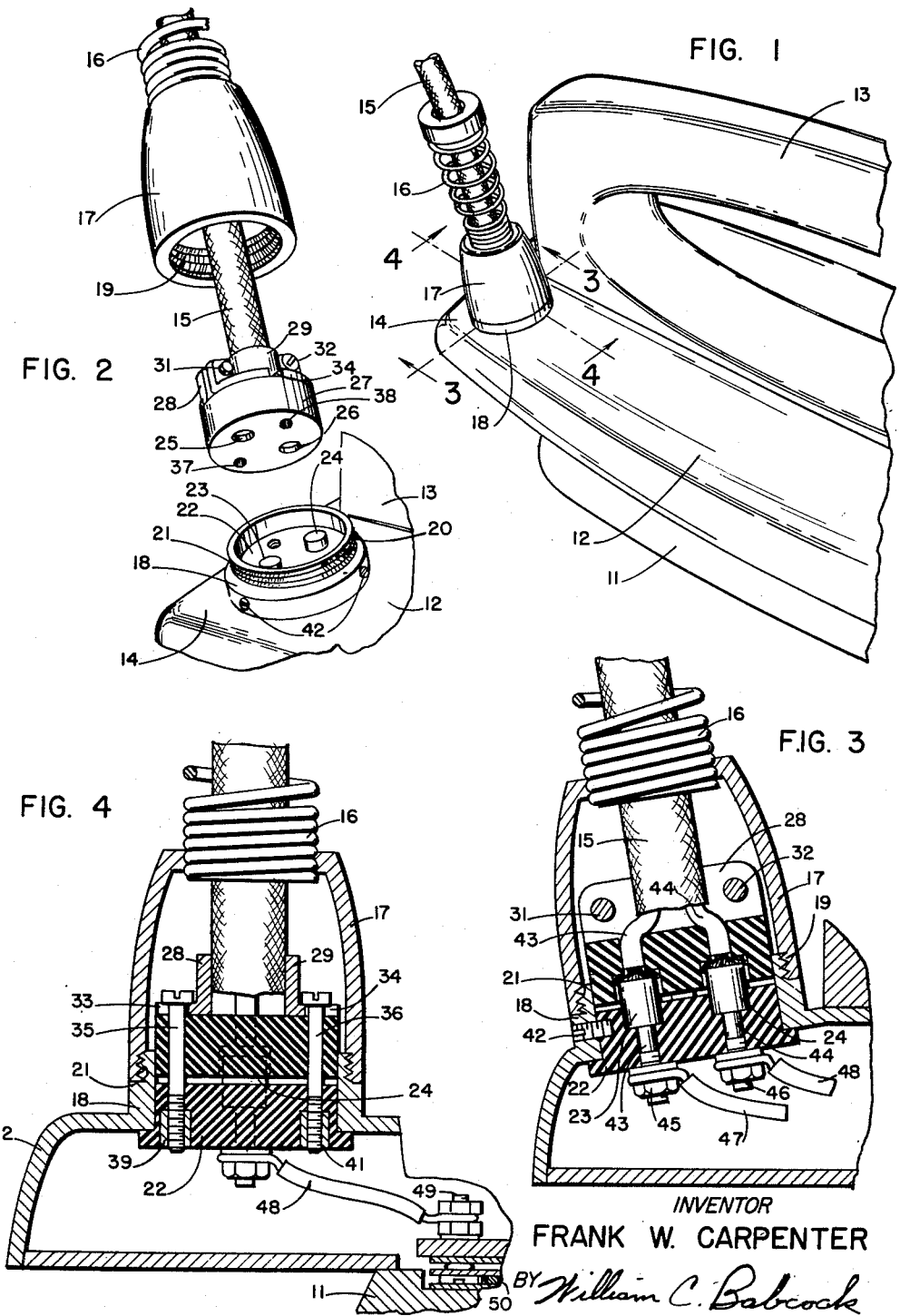

2,666,125

UNITED STATES PATENT OFFICE 2,666,125

FLATIRON CORD CONNECTION

Frank W. Carpenter, Minneapolis, Minn., assignor to General Mills, Inc., a corporation of Delaware Application June 14, 1948, Serial No. 32,896

4 Claims. (Cl. 219—25)

This application relates to flatirons and more particularly to an improved cord connection for electric flatirons and similar appliances.

Flatiron cords are ordinarily of two types. In the first category fall those irons in which the cord is provided with a plug which is readily detachable from the iron during storage. The second type of iron includes a cord which is permanently connected and which customarily passes through the handle post of the iron. While the permanently connected cords offer certain advantages, they sometimes break at the point of attachment. To replace such a cord, a portion of the iron must be disassembled. To avoid this difficulty, one object of the present invention is to provide a cord connection of a semi-permanent nature which may however be readily replaced or repaired whenever the cord is damaged.

A further object is a cord connection for flatirons in which the connection of the supply cord is made outside the body of the iron and in which said connections are protected by a housing surrounding the cord and detachably carried by the iron.

Still another object is a cord connection in which a housing for the supply cord connections is threaded to a sleeve on the body of the iron to protect the point of connection of the cord and permit ready access in case of necessary repairs.

Other objects and advantages will be apparent from the following specification and from the drawings in which Figure 1 is a partial perspective view of a flatiron embodying the present invention with the cord fully connected to the iron.

Fig. 2 is a partial perspective view of the parts of Fig. 1 with the cord and its housing in disassembled position.

Fig. 3 is a sectional view on the line 3—3 of Fig. 1.

Fig. 4 is a sectional view on the line 4—4 of Fig. 1.

Fig. 5 is a sectional view similar to Fig. 3, of a modified form of the invention, and Fig. 6 is a view similar to Fig. 2 of the modified device of Fig. 5.

As shown in Figs. 1 through 4, the construction of the present invention is applied to a flatiron having the usual soleplate 11 and housing or cover member 12. A handle 13, ordinarily of plastic or heat resistant material, is fastened to the cover plate and soleplate in any desired manner so that the parts are maintained in assembled relation.

The rear portion 14 of the cover member 12 may extend back beyond the end of the soleplate 11 to provide a heel rest for tilting the iron to inoperative position in known manner.

An electric supply cord 15 is provided with connections mounted on this rearwardly extending portion 14 of the cover 12. Surrounding the cord 15 is a resilient or spring-like cord guide 16 which prevents sharp bends in the cord at the point of attachment to the iron.

A hollow housing or sleeve 17 is fastened to a cooperating member 18 in the form of an annular sleeve or bushing projecting from the edge of an opening in the cover plate 12. As shown in Fig. 2, the internal lower edge of the housing 17 is threaded at 19 for cooperation with external threads 21 on the bushing or sleeve 18.

A lower insulating disk 22 is positioned in the opening in the cover plate inside the sleeve or bushing 18, and terminals 23 and 24 project through this insulating disk. These terminals 23 and 24 are connected to the electrical heating elements inside the flatiron in any desired fashion.

Sockets 25 and 26 in an upper insulating member 27 cooperate with the projecting terminals 23 and 24 to receive said terminals and provide for engagement of the terminals with the ends of the wires in the supply cord. A cord clamp consisting of similar cooperating members 28 and 29 is located above the insulating disk 27. The two portions of the clamping member are held together by screws 31 and 32 so that said members will engage the cord 15 tightly and will prevent withdrawal of the cord from the clamp.

From Fig. 4 it is apparent that the clamping members 28 and 29 have a horizontal lower flange provided with notches 33 and 34 designed to accommodate fastening screws 35 and 36. These screws pass through the slots 33 and 34 and also through holes 37 and 38 in the insulating member 27. Similar openings in the lower insulating plate 22 permit the screws 35 and 36 to be threaded into metallic bushings 39 and 41 which are rigidly mounted in the lower insulating plate 22.

Retaining screws 42 (Figs. 2 and 3) engage the lower insulating bushing 22 through openings in the projecting rim 18 and serve to hold member 22 in position inside the rim. Thus when screws 35 and 36 are passed through the clamping members and the upper plate and are threaded into the metallic bushings 39 and 41 in the bottom insulating plate, all these parts, including the cord, will be held in assembled relation with respect to the body of the iron. In this particular embodiment of the invention the individual wires 43 and 44 of the supply cord 15 extend sufficiently beyond the cord clamps 28, 29 so that the bare ends of the wires project into the terminal sockets 25 and 26 of the upper insulating plate 27. Thus, when the parts are held in assembled relation by screws 35 and 36, the terminals 23 and 24 on the body of the iron will be held firmly against the resilient individual wires constituting the supply lines 43 and 44 to establish complete electrical contact between the supply cord and the internal heating element of the flatiron.

Terminals 23 and 24 are provided with threaded sections 43 and 44 of reduced diameter which pass through the lower plate 22. Nuts 45 and 46 serve as binding posts to clamp leads 47 and 48 to the respective terminal posts. These leads 47 and 48 are connected to suitable terminals 49 (Fig. 4) or to any desired internal switch member, and are thereby connected in circuit with the heating element 50 of the flatiron.

It will be noted in the above construction that the spiral spring member 16 is carried by the housing 17 and is firmly connected thereto in any desired manner. Thus, a construction has been provided in which the cord may readily be replaced by merely unscrewing the housing 17 from the threaded bushing 18 and by removing fastening screws 35 and 36. A new cord may then be assembled by reversing these operations and the assembled cord will be connected in a substantially permanent fashion to the iron but will again be easily removed when repairs are needed.

A modified form of the invention is shown in Figs. 5 and 6. Here the cover or shell 51 of the flatiron is provided with an opening in which is located a separate threaded and shouldered bushing 52. A clamping nut 53 and a suitable locking washer or gasket 60 serve to hold the bushing or sleeve 52 in position on the cover plate 51.

A lower insulating plate 54 having an external bottom shoulder is positioned inside the lower end of the bushing 52 while a similar insulating plate 55 with an upper external shoulder is located at the top of the bushing. Bolts 56 and 57 extend through the two insulating plates and serve both to hold the parts in assembled relation and also as terminal posts for the connection of the supply cord. Thus the leads 58 and 59 from the internal heating element and switch of the flatiron are clamped beneath the heads of bolts 56 and 57 while locking nuts 61 and 62 serve to hold the insulating members 54 and 55 in assembled relation to the bushing 52. The two wires 63 and 64 of the supply cord 73 are connected to the terminals 56 and 57 by suitable nuts 65 and 66.

A hollow housing member 67 similar to that of the previous embodiment of the invention is provided, and this member 67 surrounds and protects the connections for the supply cord. Internal threads 68 at the lower end of housing 67 cooperate with the external threads on bushing 52 to hold the housing 67 firmly in position with respect to the cover plate or body of the iron.

A spiral cord guide 69 in the form of a spring member is carried at the upper end of housing 67 just as in the previous embodiment. Cord clamps 71 locked together by screws 72 engage the inner end of the supply cord 73 and resist withdrawal of the cord from the housing 67. Thus, the normal strains which tend to pull the supply cord 73 from the housing are not passed along to the terminals 56 and 57 so as to break the wires 63 and 64 at their point of connection.

Here again it will be apparent that a structure has been provided in which terminal posts on the exterior of the flatiron are readily connected in permanent fashion to a supply cord, said connections being concealed and protected by an annular housing member or sleeve which is threaded to a bushing on the body of the iron. Therefore, in the event of breakage of the supply cord, it is a simple matter to unscrew the housing 67 and the terminal nuts 65 and 66 in order to replace the supply cord or repair it.

Since modifications and changes may be made in the exact structure shown in the drawings, it is my intention that all such variations shall be considered a part of this invention as may fall within the scope and spirit of the attached claims.

Now, therefore, I claim:

1. An electric flatiron having a soleplate, a heating element, a cover shell mounted above the soleplate, the shell having an opening therethrough, a first insulating plate secured in said opening, projecting terminal posts mounted on said first plate and connected internally of the shell in circuit with the heating element, a second insulating plate located outwardly of the first plate and having sockets into which the terminal posts project, an electric supply cord having a wire with an uninsulated end projecting loosely into each socket, a cord clamp located outwardly of the second plate, a tubular outer sleeve quickly detachably mounted on said shell and enclosing said plates, cord clamp, posts, sockets and cord ends, and single fastening means accessible only when said outer sleeve is removed and passing through the first and second plates and the cord clamp and holding the parts in assembled relation with the uninsulated wire ends clamped in tight frictional engagement against the terminals and otherwise unsecured thereto, whereby release of said single fastening means completely disengages the cord clamp, wire ends and second plate from said first insulating plate.

2. An electric flatiron having a soleplate, a heating element, a cover shell and a handle mounted above the soleplate, the shell having an opening therethrough adjacent the handle, a first insulating plate secured in said opening, projecting terminal posts mounted on said first plate and connected internally of the shell in circuit with the heating element, a second insulating plate located outwardly of the first plate and having sockets into which the terminal posts project, an electric supply cord having a wire with an uninsulated end projecting loosely into each socket, a cord clamp located outwardly of the second plate, a tubular outer sleeve quickly detachably mounted on said shell and enclosing said plates, cord clamp, posts, sockets and cord ends, and single fastening means accessible only when said outer sleeve is removed and passing through the first and second plates and the cord clamp and holding the parts in assembled relation with the uninsulated wire ends clamped in tight frictional engagement against the terminals and otherwise unsecured thereto, whereby release of said single fastening means completely disengages the cord clamp, wire ends and second plate from said first insulating plate.

3. An electric flatiron having a soleplate, a heating element, a cover shell and a handle mounted above the soleplate, the shell having an opening therethrough adjacent the handle with a threaded annular bushing extending from the shell at the edge of the opening, a first insulating plate secured in said bushing, projecting terminal posts mounted on said first plate and connected internally of the shell in circuit with the heating element, a second insulating plate located outwardly of the first plate and having sockets into which the terminal posts project, an electric supply cord having a wire with an uninsulated end projecting into each socket, a cord clamp located outwardly of the second plate, single fastening means passing through the first and second plates and the cord clamp and holding the parts in assembled relation with the uninsulated wire ends clamped against the terminals, and a sleeve removably mounted on the bushing and enclosing the plates and clamp, the sleeve having a resilient cord guide at its outer end.

4. An electric flatiron having a soleplate, a heating element, a cover shell mounted above the soleplate and having an opening therethrough, a first insulating plate secured in said opening and having projecting terminal posts thereon and at least one threaded bushing therein, a second insulating plate adjacent the outer surface of the first plate and having sockets into which the terminal posts project, an electric supply cord having an uninsulated wire portion in each socket, a cord clamp engaging the supply cord adjacent the second plate, the cord clamp and second plate having openings aligned with the threaded bushing of the first plate, and a retaining screw passing through the aligned openings and into the bushing and holding the cord clamp and second plate in assembled position with the wire portions pressed in contact with their respective terminal posts.

FRANK W. CARPENTER.

References Cited in the file of this patent

UNITED STATES PATENTS

| Number | Name | Date |
|---|---|---|
| 1,028,580 | Lux | June 4, 1912 |
| 1,034,265 | Madsen | July 30, 1912 |
| 1,187,757 | Madsen | June 20, 1916 |
| 1,527,236 | Tidball | Feb. 24, 1925 |
| 1,533,258 | MacFarland | Apr. 14, 1925 |
| 1,645,667 | Spahr | Oct. 18, 1927 |
| 1,703,046 | Paiste | Feb. 19, 1929 |
| 1,704,626 | Nero | Mar. 5, 1929 |
| 1,768,522 | Brown | June 24, 1930 |
| 1,901,232 | Glowacki | Mar. 14, 1933 |
| 2,112,752 | Abbott | Mar. 29, 1938 |
| 2,269,177 | Borchert et al. | Jan. 6, 1942 |
| 2,277,161 | Sickinger | Mar. 24, 1942 |
| 2,286,952 | Cannon et al. | June 16, 1942 |
| 2,308,515 | Kistner | Jan. 19, 1943 |